B. MORGAN.
HOSE COUPLING.
APPLICATION FILED JAN. 3, 1908.

909,200.

Patented Jan. 12, 1909.

WITNESSES:
Edward Thorpe.
Isaac B. Owens.

INVENTOR
Bernard Morgan
BY Munn Co.
ATTORNEYS

UNITED STATES PATENT OFFICE.

BERNARD MORGAN, OF NEWPORT, RHODE ISLAND.

HOSE-COUPLING.

No. 909,200.  Specification of Letters Patent.  Patented Jan. 12, 1909.

Application filed January 3, 1908. Serial No. 409,191.

*To all whom it may concern:*

Be it known that I, BERNARD MORGAN, a subject of the King of Great Britain, and a resident of Newport, in the county of Newport and State of Rhode Island, have invented a new and Improved Hose-Coupling, of which the following is a full, clear, and exact description.

This invention relates to certain improvements in fastening devices adapted for use in connection with tubular or cylindrical bodies, and more particularly adapted for securing together two such bodies, as, for instance, securing a hose to a pipe.

The invention relates to that type of fastening devices in which a band is employed for encircling the parts to be fastened, and having a shoe at one end thereof and threaded for the reception of a nut at the opposite end thereof, said nut engaging with the shoe to hold the ends of the band together.

The object of the invention is to provide certain improvements in the shoe, whereby it is adapted for use in connection with bodies of various diameters.

Reference is to be had to the accompanying drawings which illustrate as an example the preferred embodiment of my invention, in which drawings—

Figure 1:
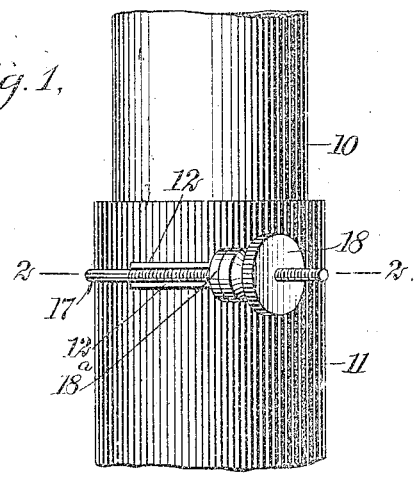
Figure 2:
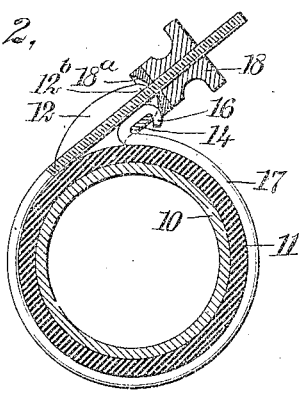
Figure 3:
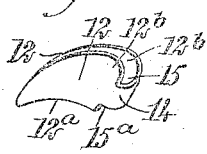

Figure 1 is an elevational view of the coupling in position; Fig. 2 is a section on the line 2—2 of Fig. 1; and Fig. 3 is a detail perspective view of the shoe which I employ.

10 indicates a rigid pipe, and 11 indicates a flexible hose. According to the embodiment of the invention here shown it is designed especially to couple the parts 10 and 11 together by clamping the hose 11 over the pipe 10.

The shoe of the coupling is formed preferably of sheet metal, and comprises two cheek pieces 12 identical in form and joined by a connecting section 14. Said cheek pieces 12 extend in approximate parallelism to each other, and the connecting piece 14 is narrower than the width of the cheek pieces so as to leave spaces 15 and $15^a$, respectively above and below the connecting pieces. The inner edges of the cheek pieces 12 are curved as indicated at $12^a$, to suit the curvature of the pipe, while the outer edges of the cheeks 12 have rounding points $12^b$, the function of which will hereinafter fully appear. Engaged with the connecting piece 14 of the shoe is a hook 16, on one end of a clamping wire 17. Said hook lies in the openings 15 and $15^a$ so that the lower edges $12^a$ of the cheek pieces 12 may rest firmly against the hose. The clamping wire 17 encircles the hose 11, and has its opposite end passed between the cheek pieces 12. Said end is threaded and provided with a nut 18, which holds a cupped washer $18^a$ against the points $12^b$ of the cheek piece 12 of the shoe, so as to insure secure engagement between the nut and cheek pieces.

By assembling the parts as illustrated in Fig. 2, and operating the nut 18 the clamping wire 17 may be forced tightly around the hose, binding it against the pipe, the shoe and nut serving to join the ends of the clamping wire and permitting any desired tension to be exerted on said wire. The extreme simplicity of the device enables it to be constructed at a low cost, and at the same time insures effective operation.

Having thus described the preferred form of my invention, what I claim as new and desire to secure by Letters Patent is:

A device of the class described, comprising a shoe having approximately parallel cheek pieces with a connecting member extending between them at one end thereof, the shoe having curved inner edges and rounded projections at its outer side, and said connecting member having less width than the cheek pieces, to leave spaces at the sides of the connecting member, a clamping band, one end of which engages said connecting member and is accommodated by said spaces at the sides thereof, the other end of the clamping band being extended between the cheek pieces, and a member operating on the second-mentioned end of the clamping band and having a cavity receiving the rounded projections of the shoe.

In testimony whereof I have signed my name to this specification in the presence of two subscribing witnesses.

BERNARD MORGAN.

Witnesses:
 EVERARD B. MARSHALL,
 C. W. FAIRBANK.